United States Patent Office 3,023,249
Patented Feb. 27, 1962

3,023,249
PREPARATION OF POLYMERIC PEROXIDES
FROM CONJUGATED DIOLEFINS
William M. Hutchinson, Bartlesville, Okla., assignor to Phillips Petroleum Company, a corporation of Delaware
No Drawing. Original application Mar. 25, 1952, Ser. No. 278,503, now Patent No. 2,879,306, dated Mar. 24, 1959. Divided and this application Dec. 29, 1958, Ser. No. 783,130
19 Claims. (Cl. 260—610)

This invention relates to the preparation of a polymeric oxidation product of a conjugated diolefin.

This application is a division of my copending application Serial No. 278,503, filed March 25, 1952, now U.S. Patent 2,879,306, issued March 24, 1959.

According to the invention there is provided a process for the preparation of a polymeric oxidation product of a conjugated diolefin starting material selected from the group of diolefins having the formula

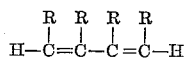

wherein R is selected from the group consisting of a hydrogen atom and a methyl radical, and at least two of said R substituents are hydrogen, said oxidation product comprising repeating units of the type ⟨R′—O—O⟩ wherein R′ is selected from the group consisting of

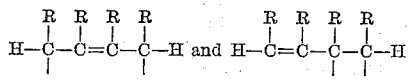

wherein R is as defined above, which process comprises forming said polymeric oxidation product by reacting said diolefin and oxygen at a temperature within the range of 71 to 150° C., said reaction being carried out under a partial pressure of oxygen of at least 20 pounds per square inch sufficient to maintain said conjugated diolefin starting material in liquid phase and for a period of time within the range of 0.1 to 25 hours.

Starting materials applicable to use in the present invention are the conjugated diolefins of the formula:

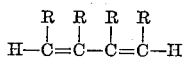

wherein the R's can be hydrogen, or methyl groups and at least two of the R's are hydrogen. Typical conjugated diolefins applicable to the present invention include 1,3-butadiene, isoprene (2-methyl-1,3-butadiene), piperylene (1,3-pentadiene), 2,3-dimethyl-1,3-butadiene, and the like.

The above diolefins can be converted according to the invention by a suitable oxidation process wherein a substantial portion of diolefin is converted to peroxidic polymer. I have prepared oxidation products of conjugated diolefins by liquid phase oxidation of a candidate conjugated diolefin with air or oxygen. When operating by the method which I have employed, the conjugated diolefin oxidation reaction can be conducted in any suitable pressure reactor provided with means to thoroughly mix air or oxygen and diolefin. Contact times in the oxidation step will be from 0.1 to 25, preferably 1 to 5 hours in duration. Said oxidation step is conducted within the temperature range of 50° C. to 150° C. and at a partial pressure of oxygen above 20 pounds per square inch and generally not over 4000 pounds per square inch. Preferred operation will be in the range from 100 to 400 pounds per square inch. The total pressure of the system will be sufficient to maintain a conjugated diolefin liquid phase. I have usually preferred to employ an initiator to start the oxidation reaction. Suitable materials which can be used for this purpose include peroxides or hydroperoxides, diazothioethers, and others known in the art. Oxidation promotors such as acetaldehyde, cobalt linoleate, and the like are also employed in the oxidation reaction. The oxidation effluent will comprise polymeric peroxidic materials containing repeating units of the types (1) 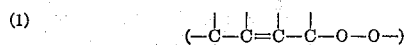

(2) 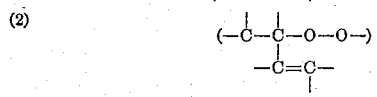

which are referred to as diolefin peroxides, together with carbonylic compounds having the same carbon skeleton as the diolefin starting material or multiples thereof. In the claims the skeletal arrangement of the carbon atoms in the above formulas is referred to as R′.

At the end of the oxidation period, unreacted diolefin is removed and the oxidation materials are transferred to a hydrogenation zone. The hydrogenation is carried out in the presence of a solvent which can be added subsequent to the oxidation or more preferably can be present during the oxidation. If the oxidation is carried out in a solvent, additional amounts can be added subsequent to said oxidation. The solvent used can be dioxane, benzene, tetrahydrofurfuryl alcohol or the like. I have generally operated with a peroxide to solvent ratio in the range of 1:100 to 1:4 parts by weight. Use of said solvent provides convenient and safe handling of the peroxide against possible decomposition which might otherwise be dangerous.

EXAMPLE I

A. Oxidation of 1,3-Butadiene

A run was made wherein 1,3-butadiene in liquid state was charged to a pressure reactor along with a small amount of cobalt linoleate catalyst and a small amount of benzoyl peroxide initiator. After charging, compressed air was introduced until a pressure of 500 p.s.i.g. was attained in the reactor. Stirring was started and heat was applied to the reactor. After the desired temperature was attained 71° C., pressure within the reactor was raised to 800 p.s.i.g. with compressed oxygen.

The course of the reaction was followed by observing the drop in pressure within the reactor. When the pressure had decreased to a predetermined level, usually about 700 p.s.i.g., oxygen was added until 800 p.s.i.g. was again attained. Oxygen consumption was calculated from the gas phase in the reactor and the total pressure drop during the oxidation.

After the desired amount of oxygen had been consumed the reaction was terminated as follows: The temperature was quickly reduced by pumping cold water through an internal cooling coil of the reactor. On reaching a temperature of about 38° C., oxygen was vented and unreacted butadiene removed after which dioxane (800 cc.), was pumped into the reactor to dissolve the oxidation products.

Charge to reactor, conditions, and results of the oxidation are recorded in the following tabulation.

Charge:
    1,3-butadiene, grams_____ 880.2
    Cobalt linoleate, grams_____ 0.8
    Benzoyl peroxide, grams_____ 1.5
Conditions:
    Temperature, °C_____ 71–82
    Pressure, p.s.i.g_____ 700–800
    Duration, hrs_____ 5.43

The dioxane solution contained 10.85 weight percent of 1,3-butadiene peroxide based on $C_4H_6O_2$ units as determined by titration with sodium thiosulfate.

550 grams of a dioxane solution containing the above oxidation product and having a concentration of 7.8 weight percent of peroxide oxidation product calculated as 1,3-butadiene peroxide, was charged to a high pressure hydrogenator along with 0.5 gram of 10 percent palladium-on-charcoal catalyst (commercial product) and hydrogenated in two stages to produce 1,2-butanediol and 1,4-butanediol as described in said Patent 2,879,306.

A. Oxidation of 1,3-Butadiene

A run was made according to the method described in Example I where 1,3-butadiene was oxidized with compressed oxygen using benzoyl peroxide as initiator and acetaldehyde as catalyst. Approximately 600 cc. of dioxane was employed to remove butadiene oxidation products from the reactor.

Charge to reactor, recation conditions, and results of the oxidation are recorded in the following table.

Charge:
  1,3-butadiene, grams _____ 880.2
  Acetaldehyde, grams _____ 5.2
  Benzoyl peroxide, grams _____ 1.5
Conditions
  Temperature, °C _____ 71–73
  Pressure, p.s.i.g. _____ 700–800
  Duration, hours _____ 4.6

The dioxane solution contained 5.64 weight percent of 1,3-butadiene peroxide, calculated as $C_4H_6O_2$ units, as determined by titration with sodium thiosulfate.

The dioxane solution prepared according to the procedure described above was hydrogenated in a rocking type hydrogenator to produce 1,2-butanediol and 1,4-butanediol as described in said Patent 2,879,306.

It is noted that the usual precaution should be observed to prevent a vapor phase explosion with hydrocarbon and oxygen. Diene peroxides should be diluted with a suitable solvent prior to carrying out chemical reactions with them.

Reasonable variation and modification are possible within the scope of the foregoing disclosure and the appended claims to the invention.

I claim:

1. A process for the preparation of a polymeric oxidation product of a conjugated diolefin starting material having the formula

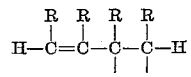

wherein R is selected from the group consisting of a hydrogen atom and a methyl radical, and at least two of said R substituents are hydrogen, said oxidation product comprising repeating units of the formula ⁺R'—O—O⁺ wherein R' is selected from the group consisting of

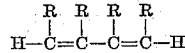

and

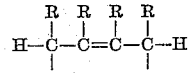

wherein R is as defined above, which process comprises forming said polymeric oxidation product by reacting said diolefin and oxygen at a temperature within the range of 71 to 150° C., said reaction being carried out under a partial pressure of oxygen of at least 20 pounds per square inch sufficient to maintain said conjugated diolefin starting material in liquid phase and for a period of time within the range of 0.1 to 25 hours.

2. A process for the preparation of normally liquid polymeric butadiene peroxide which (a) has an average composition corresponding to the empirical formula $C_4H_6O_2$, (b) comprises repeating units of said formula $C_4H_6O_2$, (c) contains divalent $C_4H_6$ radicals bonded to oxygen in the 1 and 2 positions and divalent $C_4H_6$ radicals bonded to oxygen in the 1 and 4 positions, and (d) is capable of being reacted with hydrogen to yield a mixture of 1,2- and 1,4-four-carbon glycols, which process comprises forming said polymeric butadiene peroxide by reacting butadiene and oxygen at a temperature within the range of 71 to 150° C., said reaction being carried out under a partial pressure of oxygen of at least 20 pounds per square inch sufficient to maintain said butadiene in liquid phase and for a period of time within the range of 0.1 to 25 hours.

3. A process according to claim 2 wherein said reaction is carried out in the presence of a neutral inert medium which is a solvent for both butadiene and for said polymeric butadiene peroxide.

4. A process according to claim 2 wherein said reaction is carried out in the presence of an oxidation reaction initiator which is an initiator for said reaction.

5. A process according to claim 4 wherein said initiator is selected from the group consisting of peroxides, hydroperoxides, and diazothioethers.

6. A process according to claim 2 wherein said reaction is carried out in the presence of an oxidation reaction catalyst which is a catalyst for said reaction.

7. A process according to claim 6 wherein said catalyst is selected from the group consisting of acetaldehyde and cobalt linoleate.

8. A process according to claim 5 wherein said initiator is benzoyl peroxide.

9. A process according to claim 7 wherein said catalyst is cobalt linoleate.

10. A process according to claim 7 wherein said catalyst is acetaldehyde.

References Cited in the file of this patent
UNITED STATES PATENTS 2,664,447  Lorand et al. _____ Dec. 29, 1953
2,898,377  Handy et al. _____ Aug. 4, 1959

OTHER REFERENCES

Kern et al.: Die Makromolekulare Chemie, vol. 7 (1951), pp. 199–204.